United States Patent
Cardei (10) Patent No.: US 11,210,768 B2
(45) Date of Patent: Dec. 28, 2021

(54) DIGITAL IMAGE AUTO EXPOSURE ADJUSTMENT

(71) Applicant: Google LLC, Mountain View, CA (US)

(72) Inventor: Vlad Constantin Cardei, Redwood City, CA (US)

(73) Assignee: Google LLC, Mountain View, CA (US)

( * ) Notice: Subject to any disclaimer, the term of this patent is extended or adjusted under 35 U.S.C. 154(b) by 62 days.

(21) Appl. No.: 16/685,179

(22) Filed: Nov. 15, 2019

(65) Prior Publication Data

US 2020/0082515 A1    Mar. 12, 2020

Related U.S. Application Data

(63) Continuation of application No. 15/800,539, filed on Nov. 1, 2017, now Pat. No. 10,497,105.

(51) Int. Cl.
*G06T 5/00* (2006.01)
*G06N 3/08* (2006.01)
(Continued)

(52) U.S. Cl.
CPC .............. *G06T 5/009* (2013.01); *G06K 9/036* (2013.01); *G06K 9/4661* (2013.01);
(Continued)

(58) Field of Classification Search
CPC ......... G06T 5/009; G06T 5/007; G06T 5/008; G06T 2207/20081; G06T 2207/20084;
(Continued)

(56) References Cited

U.S. PATENT DOCUMENTS

| 5,751,844 | A | * | 5/1998 | Bolin | ................ G06T 5/40 348/221.1 |
| 7,187,796 | B1 | | 3/2007 | Phan et al. | |

(Continued)

FOREIGN PATENT DOCUMENTS

| CN | 101404728 | 4/2009 |
| CN | 103530848 | 1/2014 |
| CN | 103731660 | 4/2014 |

OTHER PUBLICATIONS

J. Park, J. Lee, D. Yoo and I. S. Kweon, "Distort-and-Recover: Color Enhancement Using Deep Reinforcement Learning," 2018 IEEE/CVF Conference on Computer Vision and Pattern Recognition, Salt Lake City, UT, USA, 2018, pp. 5928-5936, doi: 10.1109/CVPR.2018.00621. (Year: 2018).*

(Continued)

*Primary Examiner* — Claire X Wang
*Assistant Examiner* — Stephen M Brinich
(74) *Attorney, Agent, or Firm* — Fish & Richardson P.C.

(57) ABSTRACT

Methods, systems, and apparatus, including computer programs encoded on a computer storage medium, for a computing system that receives images that each have a predefined exposure attribute. For each image, a first set of features of the image are extracted. The first set of features are associated with a label indicating no modification of the image is required. A luminosity characteristic of the image is adjusted to form an adjusted image. A second set of features of the adjusted image are extracted. A neural network is trained to adjust luminosity characteristics of images using the first set of features and the second set of features of the adjusted image. An exposure adjustment model adjusts luminosity characteristics of images based on correction values determined using the trained neural network.

16 Claims, 4 Drawing Sheets

(51) Int. Cl.
  *H04N 5/235* (2006.01)
  *G06K 9/46* (2006.01)
  *G06K 9/62* (2006.01)
  *H04N 5/232* (2006.01)
  *G06K 9/03* (2006.01)

(52) U.S. Cl.
  CPC ............. *G06K 9/6256* (2013.01); *G06N 3/08* (2013.01); *H04N 5/235* (2013.01); *H04N 5/2351* (2013.01); *H04N 5/23222* (2013.01); *H04N 5/23229* (2013.01); *G06T 2207/20081* (2013.01); *G06T 2207/20084* (2013.01); *G06T 2207/20208* (2013.01)

(58) Field of Classification Search
  CPC ....... G06T 2207/20; G06T 2207/20004; G06T 2207/20008; G06T 2207/20012; G06T 2207/20208; G06K 9/036; G06K 9/03; G06K 9/4661; G06K 9/6256; G06K 9/6255; G06N 3/08; H04N 5/23222; H04N 5/23229; H04N 5/235; H04N 5/2351; H04N 5/243
  See application file for complete search history.

(56) References Cited

U.S. PATENT DOCUMENTS

| | | | |
|---|---|---|---|
| 8,896,712 | B2 | 11/2014 | Border et al. |
| 8,913,827 | B1 | 12/2014 | Fang |
| 9,292,911 | B2 | 3/2016 | Paris et al. |
| 2002/0140693 | A1* | 10/2002 | Nakami .................. H04N 1/60 345/418 |
| 2011/0142303 | A1 | 6/2011 | Mathew |
| 2012/0075503 | A1 | 3/2012 | Akifusa |
| 2014/0002718 | A1* | 1/2014 | Spielberg ............. H04N 5/2354 348/362 |
| 2016/0170311 | A1 | 6/2016 | Schmitt-Weaver et al. |
| 2018/0314182 | A1 | 11/2018 | Wada |
| 2018/0374239 | A1* | 12/2018 | Wallack ............... H04N 13/246 |

OTHER PUBLICATIONS

T. Virtanen, M. Nuutinen, M. Vaahteranoksa, P. Oittinen and J. Häkkinen, "CID2013: A Database for Evaluating No-Reference Image Quality Assessment Algorithms," in IEEE Transactions on Image Processing, vol. 24, No. 1, pp. 390-402, Jan. 2015, doi: 10.1109/TIP.2014.2378061. (Year: 2015).*

Edward Laurence & Charles Murphy, "Camera Settings Prediction Using Deep Convolutional Neural Networks", D'epartement de Physique, de G'enie Physique, et d'Optique, Universit'e Laval, Quebec (Quebec), Canada G1V 0A6, May 13, 2018 (Year: 2018).*

Joon-Young Lee, Kalyan Sunkavalli, Zhe Lin, Xiaohui Shen, In So Kweon, "Automatic Content-Aware Color and Tone Stylization", 2016 IEEE Conference on Computer Vision and Pattern Recognition (CVPR) (Year: 2016).*

CN Office Action in Chinese Application No. 201880032436.5, dated Jul. 3, 2020, 12 pages.

PCT International Preliminary Report on Patentability in International Application No. PCT/US2018/049152, dated May 5, 2020, 10 pages.

Battiato. "Chapter 1: Exposure Correction for Imaging Devices: an Overview," Single-Sensor Imaging: Methods and Application for Digital Cameras, Sep. 2008, 33 pages.

Eilersten. "HDR image reconstruction from a single exposure using deep CNNs," arXiv 1710.07480, Oct. 20, 2017, 15 pages.

Gharbi. "Deep bilateral learning for real-time image enhancement," arXiv 1707.02880, Aug. 22, 2017, 12 pages.

Kriss et al. "Handbook of Digital Imaging, Chapter 4: An Introduction to Image Processing," Jan. 1, 2015, 4 pages.

Lukac Rastislav "Perceptual Digital Imaging: Methods and Applications," Jan. 1, 2013, 7 pages.

PCT International Search Report issued in International Application No. PCT/US2018/049152, dated Dec. 20, 2018, 16 pages.

Schulz et al. "Using brightness histogram to perform optimum auto exposure," WSEAS Transaction on Systems and Control 2(2), Feb. 2007, 8 pages.

Yan "Automatic Photo Adjustment Using Deep Neural Networks," arXiv 1412.7725, May 16, 2015, 15 pages.

Yuan et al. "Automatic Exposure Correction of Consumer Photographs," Computer Vision—ECCV, Aug. 2012, 14 pages.

* cited by examiner

DIGITAL IMAGE AUTO EXPOSURE ADJUSTMENT

CROSS-REFERENCE TO RELATED APPLICATION

The present application is a continuation of, and claims priority from, U.S. patent application Ser. No. 15/800,539, filed Nov. 1, 2017, now allowed. The contents of the prior application are incorporated herein by reference in their entirety.

FIELD

The present specification relates to digital photography.

BACKGROUND

Editing a digital image can include adjusting an exposure attribute of the digital image. For example, exposure attributes of digital images can be adjusted by lightening or darkening the pixels in an image, to improve the overall aesthetic appeal of the image. Lightening pixels in an image translates to over-exposing an image, while darkening pixels in an image translates to under-exposing an image. A digital camera in an electronic device can be used to produce a variety of images under different light conditions of an environment. When producing image data, digital cameras can automatically adapt to the illumination environment. For example, the automatic adaptation process can be done by dynamically changing the exposure time and shutter speed of a digital camera. In general, setting exposure values for a given scene can be rather subjective, leading to a large variation of preferred exposure values between human observers.

SUMMARY

A computer system processes a collection of digital images. The collection of digital images includes curated images and modified images. The curated images are well-exposed so that objects in the image have an appropriate brightness level that produce attractive visuals. The computer system alters the curated images to produce the modified images. The modified images are images that have been lightened or darkened to disrupt the appropriate brightness levels of the well-exposed curated images. By processing the well-exposed brightness levels of the curated images along with the altered brightness of the modified images, the computer system can learn how to adjust newly captured images to achieve appropriate brightness levels that result in attractive digital photographs. For example, an electronic device that includes a digital camera may also include the trained computer system. When the digital camera is used to capture new images the trained computer system can send brightness correction values to the digital camera to adjust for any detected under-exposure or over-exposure of objects in the captured image.

The computer system can include a training mode, where the curated images and modified images are processed, and a runtime mode, where the correction values are provided to the digital camera to adjust brightness levels of objects in newly captured images. The computer system may be a machine learning system that uses different technologies, e.g., a neural network, to learn the appropriate brightness levels for different types of digital images. In the training mode, the machine learning system learns by processing training data. The training data is represented by the collection of digital images as well as any related correction values that indicate how much the modified images have been lightened or darkened.

One aspect of the subject matter described in this specification can be embodied in a computer-implemented method. The method includes, receiving, at a computing system, multiple images that each have a predefined exposure attribute. For each image of the multiple images that have the predefined exposure attribute, the method includes: extracting, by a feature extractor of the computing system, a first set of features of the image; associating, by an image processor of the computing system, the first set of features with a label indicating no modification of the image is required; adjusting, by the image processor, a luminosity characteristic of the image in accordance with a particular adjustment magnitude to form an adjusted image; and extracting, by the feature extractor, a second set of features of the adjusted image.

The method also includes training a neural network of a machine learning (ML) system to determine correction values for adjusting luminosity characteristics of images, the neural network being trained using the first set of features of the image having the predefined exposure attribute and the second set of features of the adjusted image; and adjusting, by an exposure adjustment model of the machine learning system, luminosity characteristics of images based on the correction values determined using the neural network.

These and other implementations can each optionally include one or more of the following features. For example, in some implementations, associating the first set of features with a label comprises: generating a zero correction value that indicates no modification of the image is required. In some implementations, extracting the first set of features of the image and the second set of features of the adjusted image comprises: identifying, by an object recognizer of the computing system, one or more objects included in a digital image; and in response to identifying the one or more objects, extracting one or more features associated with the one or more recognized objects. In some implementations, extracting the second set of features of the adjusted image comprises: generating a correction value based at least in part on the adjusted image, the correction value indicating an amount of correction for reversing adjustments to the luminosity characteristic.

In some implementations, adjusting the luminosity characteristic of the image comprises generating an adjustment value that indicates the particular adjustment magnitude. In some implementations, the adjustment value that indicates the particular adjustment magnitude is an inverse of the correction value. In some implementations, training the neural network to adjust luminosity characteristics of images comprises: generating an exposure adjustment model to adjust an exposure attribute that includes at least a luminosity characteristic of a particular image, the exposure adjustment model being generated using the trained neural network of the ML system. In some implementations, adjusting luminosity characteristics of images comprises: generating at least the particular image using circuitry for a digital camera of a user device, the particular image corresponding to a current image produced by an image generator of the digital camera; and adjusting the luminosity characteristic of the current image based on the correction values provided by the exposure adjustment model.

The subject matter described in this specification can be implemented in particular implementations and can result in one or more of the following advantages. Generates a training data set for training machine learning model based on extracted features of curated well-exposed images and adjusted images. Exposure attributes of the well-exposed images are adjusted to form the adjusted images of the training data set. Correction values associated with extracted features of the adjusted images are included in the training data. A neural network is trained to accurately adjust exposure attributes of digital images based on analysis of the features and correction values of the training data set.

Use of the described teachings enables a computing system to realize improvements in computing efficiency and processor utilization. A predictive model produces a correction value used to automatically adjust exposure values of a digital image. For example, a single correction value can be used to modify luminosity characteristics of an image to quickly and efficiently produce a well-exposed captured image, or to change exposure characteristics of a digital camera to quickly and efficiently produce a well-exposed captured image. This streamlined approach to improving aesthetics of a digital image minimizes extraneous processing to manually adjust image brightness or image color characteristics. Such reductions in extraneous processing provide improvements in computing efficiency, reduces processor utilization, and improves the overall operation of the computer system itself.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
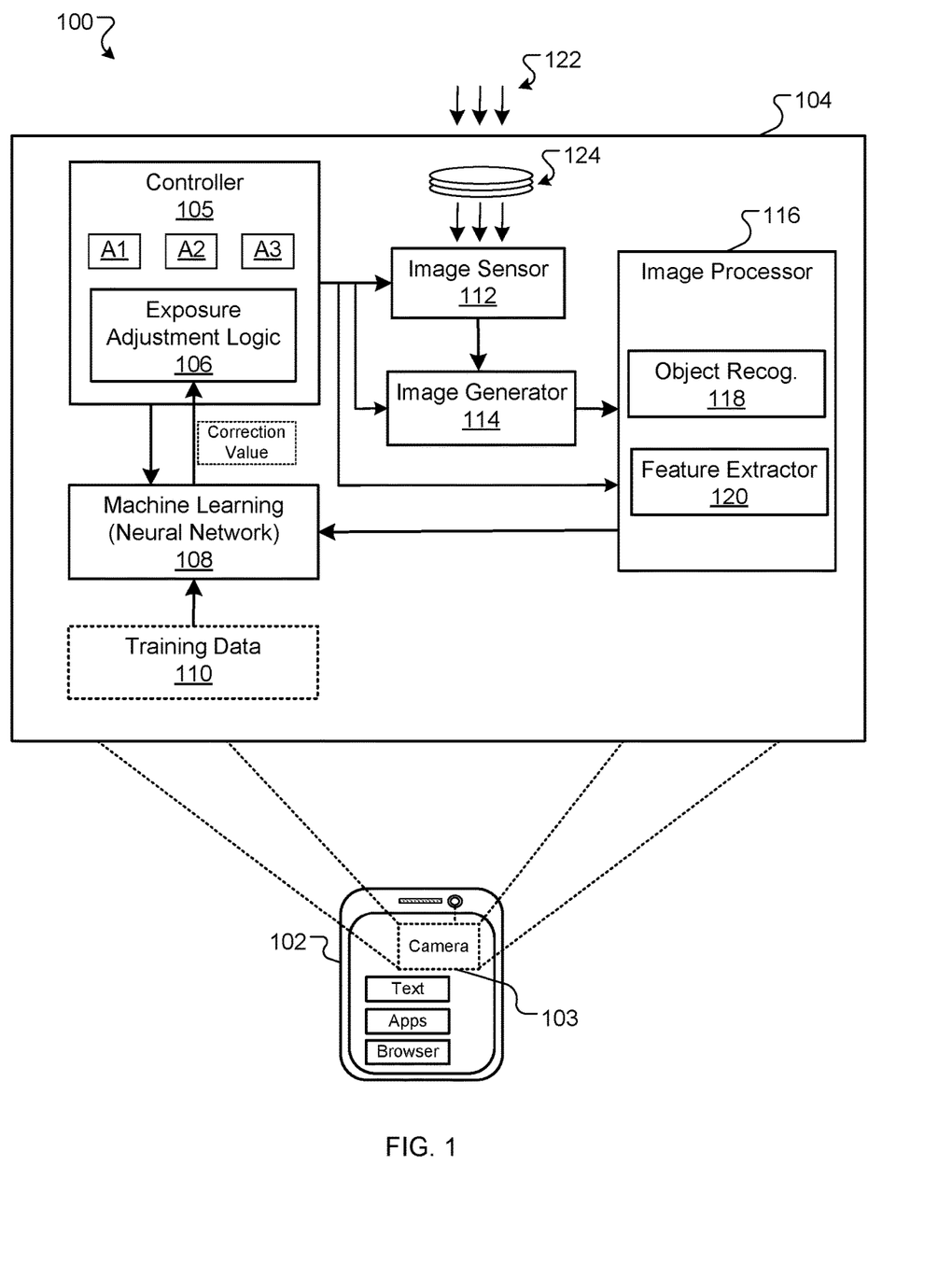
FIG. 1 illustrates an example computing system for adjusting an exposure attribute of a digital image.

FIG. 1 illustrates an example computing system 100 for adjusting an exposure attribute of a digital image. System 100 generally corresponds to circuitry 104 of a user device 102. User device 102 includes an example digital camera 103 for capturing digital images. User device 102 can be associated with an electronic device such as cellular smart phone, a stand-alone camera, or an electronic device that includes or incorporates a digital camera. In some implementations, circuitry 104 includes one or more electronic components for implementing digital camera 103. User device 102 can be at least a smartphone, or any known computer system, such as a desktop computer, a laptop computer, a tablet device, a mobile device, or any other related computing device that receives and processes digital image data associated with a digital camera.

Circuity 104 can include electronic hardware components that form respective computing modules. The modules can be used to implement a controller 105, adjustment logic 106, a machine learning (ML) system 108, an image sensor 112, an image generator 114, and an image processor 116. As used in this specification, the term "module" is intended to include, but is not limited to, one or more computers configured to execute one or more software programs that include program code that causes a processing unit(s)/device(s) of the computer to execute one or more functions. The term "computer" is intended to include any data processing or computing devices/systems, such as a desktop computer, a laptop computer, a mainframe computer, a personal digital assistant, a server, a handheld device, a smartphone, a tablet computer, an electronic reader, or any other electronic device able to process data.

Controller 105 can include one or more processors, memory, and data storage devices that collectively are used to execute one or more control functions of system 100. Processors of the controller 105 process instructions for execution by components of system 100, including instructions stored in the memory or on the storage device to display graphical information for a graphical user interface (GUI) on an example display of user device 102. Controller 105 provides control signals for initiating or controlling the respective functions of ML system 108, image sensor 112, image generator 114, and image processor 116.

Execution of the stored instructions can cause one or more of the actions described herein to be performed by system 100, including ML system 108 described below. In other implementations, multiple processors may be used, as appropriate, along with multiple memories and types of memory. For example, system 100 may be connected with multiple other computing devices, with each device (e.g., a server bank, groups of servers, modules, or a multi-processor system) performing portions of the actions or operations associated with the various processes or logical flows described in this specification.

Image sensor 112 can be configured for electrical coupling to an example circuit board of user device 102. Image sensor 112 may be included in a camera of an electronic device that also includes a plurality of optical elements for capturing an image. For example, digital camera 103 can include multiple optical elements 124 (e.g., lenses) that form a lens stack. Optical elements 124 are used, along with image sensor 112, to capture images via user device 102 based on light/light waves 122. For example, optical elements 124 function to transmit light waves to image sensor 112. Although three optical elements 124 are shown at FIG. 1, in some implementations, digital camera 103 can include more or fewer optical elements or lenses.

Image sensor 112 can include a charged coupled device (CCD) image sensor, complementary metal-oxide-semiconductor (CMOS) image sensor, active pixel sensor (APS) image sensor, N-type metal-oxide-semiconductor (NMOS), combinations thereof, and/or other sensors. In general, user device 102 captures digital images using image capture features and components of digital camera 103. In particular, image sensor 112 captures light 122 focused through optical elements 124 and communicates associated multi-pixel image data (e.g., at least 1,000 pixels by 1,000 pixels) to image generator 114. Image generator 114 receives streams of numerical image data and executes computing functions for processing (e.g., compressing or decompressing) the image data to generate image content that can be digitally rendered. For example, the image content can be generated and provided for display to a user via an example display screen of user device 102.

Image processor 116 can include computing logic in the form software instructions for implementing an object recognizer 118 and a feature extractor 120. Recognizer 118 can analyze a digital image to identify or detect objects of the image. For example, a digital image can include multiple items or objects, such as a human face, a scenic landscape, or an example physical construct associated with a background of the image. In some implementations, recognizer 118 receives, from image generator 114, image pixel data for generating a digital image. Recognizer 118 can then analyze the image pixel data to recognize, detect, or identify a particular object included in the image.

In response to analyzing the digital image, image processor 116 can use extractor 120 to extract one or more features of the digital image based on the analyzed image pixel data. For example, a digital image can include recognized objects that pertain to a human face or a scenic landscape. Extractor 120 can extract multiple features or pixel data that are associated with each of these recognized objects. Extracted features can include luminosity characteristics or related brightness information indicated by image pixel data for the digital image. As described in more detail below, an exposure attribute of a digital image can include luminosity characteristics or related brightness information represented by data values of the image pixel data. Image processor 116 can generate one or more labels that correspond to correction values for indicating exposure attributes of features extracted from a digital image.

Machine learning (ML) system 108 can include an artificial neural network ("neural network") represented by one or more processor microchips. In some implementations, ML system 108 is included within system 100 as a subsystem of hardware circuits that include at least one neural network. The neural network of ML system 108 can be trained to produce a predictive model configured to automatically adjust an exposure attribute of a digital image generated by image generator 114. For example, the neural network of ML system 108 can be trained using data inputs or features stored as training data 110. As described in more detail below, the data inputs for the training data 110 can be image features that are extracted from multiple curated images, as well as from the modified curated images. In addition to neural networks, other machine learning techniques, such as regression analysis, decision trees, statistical analysis, or other related techniques, are also within the scope of this disclosure.

As used herein, exposure is the amount of light per unit area, [e.g., an image plane illuminance x an exposure time], that reaches an electronic image sensor (or photographic film). In some implementations, the exposure (amount of light per unit area) can be determined by a shutter speed and a relative opening defined by a lens aperture (not shown) of digital camera 103. In some instances, in addition to the shutter speed and lens aperture, scene luminance for a particular region of a digital image can used to determine exposure of a digital image. Controller 105 can determine respective parameter values for each of the shutter speed, lens aperture, and scene luminance. Controller 105 can then determine or compute an exposure value that represents an exposure attribute of a digital image using one or more of the respective parameter values.

System 100 can include one or more distinct and/or concurrent operating modes. For example, in some implementations, system 100 includes a training mode in which extracted features and corresponding label data (correction values) are stored as data inputs or input features to form training data 110. As described below, an example neural network can be trained, using input features of training data 110, to produce a predictive model.

The predictive model is an exposure adjustment model that is used to adjust exposure attributes of a digital image. For example, in other implementations, system 100 includes a run-time mode in which an exposure adjustment model of ML system 108 provides image correction values to controller 105. The image correction values are generated based on extracted image features (e.g., for image pixel brightness, color, etc.) and are used to adjust (or correct) an exposure attribute of a digital image. The adjustment model adjusts digital image brightness, including color, contrast, or other image features, in real-time to generate digital images having enhanced aesthetics and that more visually appealing un-relative to non-adjusted images.

Figure 2:
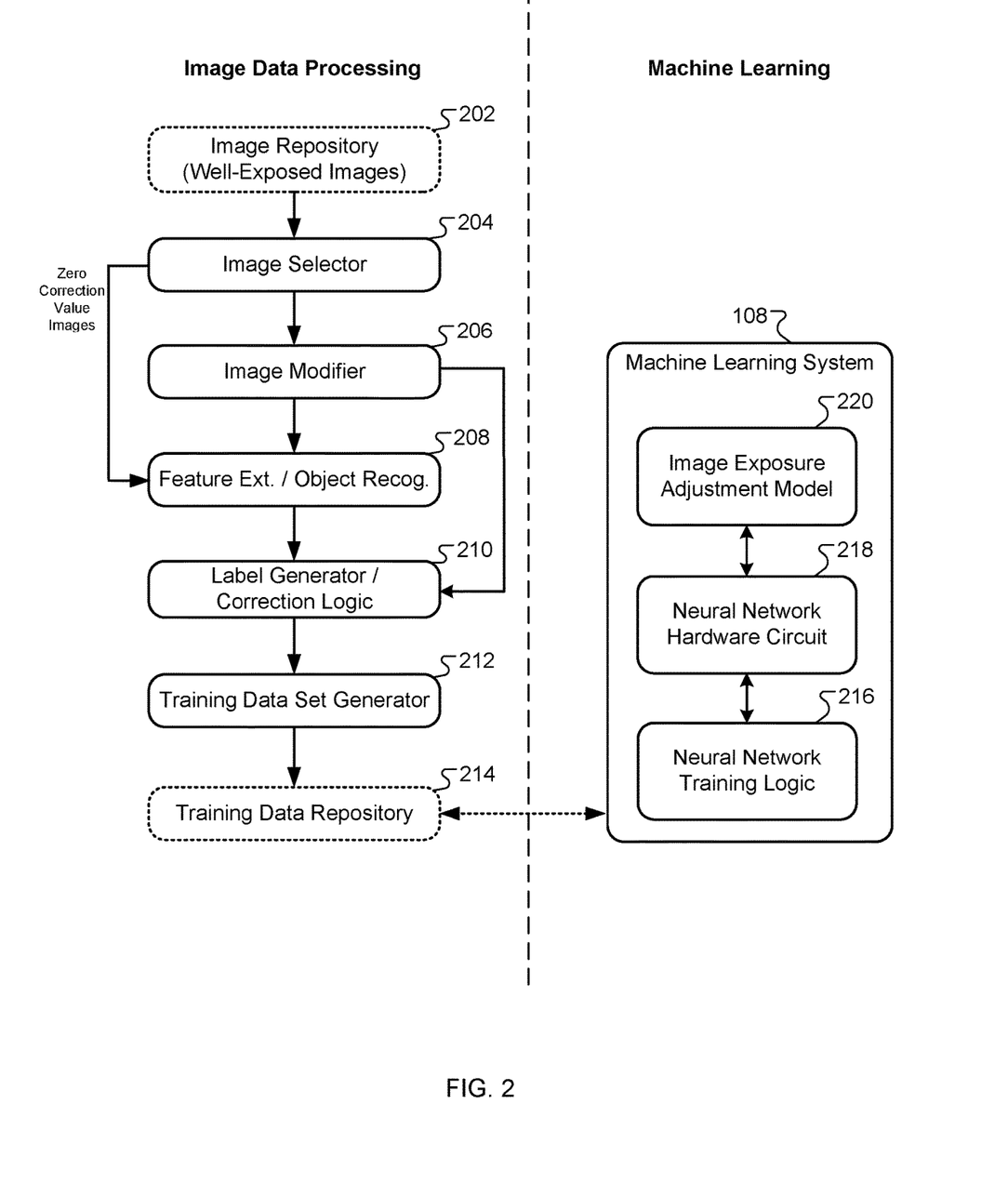
FIG. 2 illustrates a logic diagram including computing functions for adjusting an exposure attribute of a digital image.

FIG. 2 illustrates a logic diagram referencing computing functions and components for adjusting an exposure attribute of a digital image. The computing functions and components of FIG. 2 correspond to capabilities and components of system 100 described above. In some implementations, computing functions and components of FIG. 2 are implemented using an example server or cloud-based computing system that communicates with system 100. As shown, the logic diagram of FIG. 2 includes an example image data processing flow and a machine learning process flow. The image data processing flow is used by system 100 to generate training data 110 for training a neural network of ML system 108. The machine learning process flow is used by system 100 to train the neural network to generate or produce a predictive model that determines exposure correction values for enhancing exposure characteristics of a digital image.

Referring initially to image data processing, image repository 202 is an example computer-readable storage device for storing multiple curated images. Each of the multiple curated images can be digital images that are described as "well-exposed." As used herein, well-exposed images are digital images that have predefined exposure attributes or characteristics that contribute to the image being perceived as attractive, aesthetically pleasing, or visually engaging to a user.

The multiple curated images of image repository 202 can be professionally produced photographic images that are depicted in well-known media publications. In some implementations, the multiple curated images form a large image set that includes images from different authors, different cameras/digital cameras, and include visuals of a large variety of scenes and image styles. For example, the curated images can include scenes and styles, such as portraits, landscapes, night shots, underwater shots, or other related content themes. Each of these images can be characterized as properly exposed and not needing any further exposure adjustments.

Image selector 204 is used to identify and select particular types of digitals images from among the multiple curated images that are included in image repository 202. For example, image selector 204 selects subsets of curated/original digital images (first images) that are provided to an image modifier 206. As described below, modified images can be linked to corresponding correction values that characterize a scope or extent of the modification to the image. In some implementations, image selector 204 selects a subset of images that are linked to, or associated with, zero correction values. For example, zero correction values can be linked to curated first images for which zero correction is required to undue or reverse modifications or adjustments applied by image modifier 206. Image selector 204 selects at least one subset of curated digital images and provides image data for the subset of original first images as inputs to extraction and recognition logic 208.

Image modifier 206 receives selected subsets of curated first images from image selector 204 and applies exposure modifications and adjustments to each image to produce a varied set of adjusted images (second images). For each first image in the subset, image modifier 206 can modify or adjust exposure attributes or luminosity characteristics of the image to generate a number of related or adjusted images. In some implementations, image processor 116 uses modifier 206 to adjust a luminosity characteristic of an image in accordance with a particular adjustment magnitude to form an adjusted image.

For example, image modifier 206 modifies or adjusts exposure attributes or luminosity of the image by darkening or brightening the corresponding source image (e.g., curated first image). In some implementations, adjusting a luminosity characteristic of an image includes generating an adjustment value that indicates a particular magnitude of the adjustment, e.g., the magnitude of brightening or the magnitude of darkening. In some implementations, each of the adjusted second images is associated with a change in exposure that can be measured in F-stops or as a F-stop multiplier. As used herein, F-stop can be a numerical value (e.g., a fraction) used to measure an aperture opening as a fraction of the focal length of lenses 124.

Extraction and recognition logic 208 corresponds to extractor 120 and recognizer 118 described above. For brevity, the above descriptions of extractor 120 and recognizer 118 can be referenced for extraction and recognition logic 208. As shown at FIG. 2, logic 208 receives image data from image selector 204 and image modifier 206. For example, logic 208 can receive image data for a subset of first images (unmodified curated images) and image data for a subset of second images (adjusted images). Based on analysis of image data for the respective subsets of first and second images, logic 208 can recognize one or more objects, e.g., human face, mountains, forest, etc., of the images. For at least each of the detected objects, logic 208 extracts respective sets of features, e.g., image pixel data, for the detected objects of the images.

For example, logic 208 can extract a first set of features for a variety of well-exposed curated images. Extracted features of the well-exposed first images can include image content showing attractive visuals of forests and mountain ranges. Similarly, logic 208 can extract a second set of features for a variety of modified or adjusted images. Extracted features of the modified or adjusted second images can include image content showing relatively unattractive visuals of forests and mountain ranges. The visuals may be perceived as unattractive because the second images are not well-exposed due to varying levels of adjustments to darken ("under-expose") or brighten ("over-expose") the image. Hence, the second set of extracted features are associated with images that require correction to re-adjust the exposure attributes of the images.

Label/correction logic 210 receives input data for the respective first and second sets of extracted features and associates the extracted features of each set with a label. For example, logic 210 can generate labels representing correction values based on analysis of extracted features of the first set and based on analysis of extracted features of the second set. Using logic 210, extracted features of modified second images can be linked to corresponding correction values that indicate, or characterize, a magnitude of the modification to the image. In some implementations, logic 210 generates the labels representing the correction values based on adjustment values received from image modifier 206 which indicate a magnitude of adjustment to an image.

Training data generator 212 receives sets of extracted features and corresponding correction values as an output of extraction and recognition logic 208 and generates training data for training a neural network. In some implementations, data generator 212 organizes and compiles various sets of extracted features and correction values to produce different training data sets based on particular image content, styles, or themes. For example, data generator 212 can produce data sets for training a neural network to modify or enhance exposure attributes of human face images, outdoor landscape images, or scenic mountain range images. The training data sets are compiled and stored in training data repository 214 and provided to ML system 108 for training an example multi-layer neural network.

ML system 108 includes an adjustment model 220, a neural network hardware circuit 218, and training logic 216. As indicated above, ML system 108 can include an artificial neural network represented by at least one hardware circuit 218. During a training mode of system 100, the neural network of circuit 218 can be trained to produce a predictive model represented by exposure adjustment model 220. In some implementations, hardware circuit 218 is a multi-layer neural network having multiple computing layers that are arranged in sequence. Training the multi-layer neural network can include processing sets of extracted feature inputs through layers of the neural network to compute inferences.

Adjustment model 220 is a predictive model that is configured to execute exposure adjustment logic 106 described above with reference to FIG. 1. In some implementations, exposure adjustment model 220 uses logic 106 to automatically adjust an exposure attribute of a digital image generated by image generator 114. For example, during a run-time mode of system 100, digital camera 103 is used to capture a current digital image using image sensor 112. When image sensor 112 receives light waves 122 through lens 124, image generator 114 generates image data that is provided to image processor 116. Object recognizer 118 identifies or recognizes one or more objects, e.g., a human face in the image, mountains, or deep-sea objects. Image processor 116 uses feature extractor 120 to extract image pixel features of the identified objects and provides the extracted features to model 220 of ML system 108.

Model 220 receives the extracted features and generates a correction value that is provided to controller 105. The correction value is used to adjust a luminosity characteristic of a particular object in the image data produced by image generator 114. Controller 105 receives correction values from model 220 and provides control signals to image processor 116 to adjust exposure attributes. For example, based on the correction value generated by model 220, the control signals can cause image processor 116 to adjust luminosity characteristics of the objects in the image. In some implementations, the identified object can be a mountain range where the pixel features of the mountains are under-exposed or over-exposed. Image processor 116 can brighten or darken associated pixels or adjust other aspects of the image to achieve a well-exposed image of the mountain range. In some implementations, controller 105 uses correction values from model 220 to adjust other characteristics of the image data, such as color or contrast.

As noted above, the image data processing flow is used by system 100 to generate training data sets stored in data repository 214 for training a neural network of ML system 108. In some implementations, the image data processing flow is executed by an example server or cloud-based computing system that communicates with system 100. For example, the server system can execute image data processing flow to generate training data for training an example neural network. The server system trains a neural network using training data 110, produces a predictive model based on the trained neural network, and provides the predictive model to system 100 for execution during a run-time operating mode.

ML system 108 can be trained to predict the exposure change to a generated image that is required to produce a well-exposed image. For example, a neural network of system 108 can make this prediction given only an input image feature set. In some implementations, the feature set can be a luminosity histogram, e.g., Y=0.2126 R+0.7152 G+0.0722 B or Y=(R+2G+B)/4 as a simpler approximation. In some implementations, the input to the neural network can be an example luminance histogram, such as a full 256-bin histogram as well as smaller histograms including an 8-bin histogram. In general, an output for training the neural network is the exposure correction applied to a digital image, in F-stops. For example, one f-stop can correspond to a factor of two change in image brightness or luminosity.

In some implementations, the described exposure adjustment algorithm be integrated in a larger exposure correction framework. The framework can account for additional factors to further optimize generating exposure values for producing well-exposed images. For example, the additional factors can include: i) metering modes, e.g., spot-, central area-, center weighted area- and matrix metering, to determine particular areas of interest; ii) content-dependent exposure compensation to optimize exposure values for features of interest in a scene, e.g., based on specific feature recognition, such as skin, sky, or grass; and iii) multiple-frame image acquisition to enhance the dynamic range.

Figure 3:
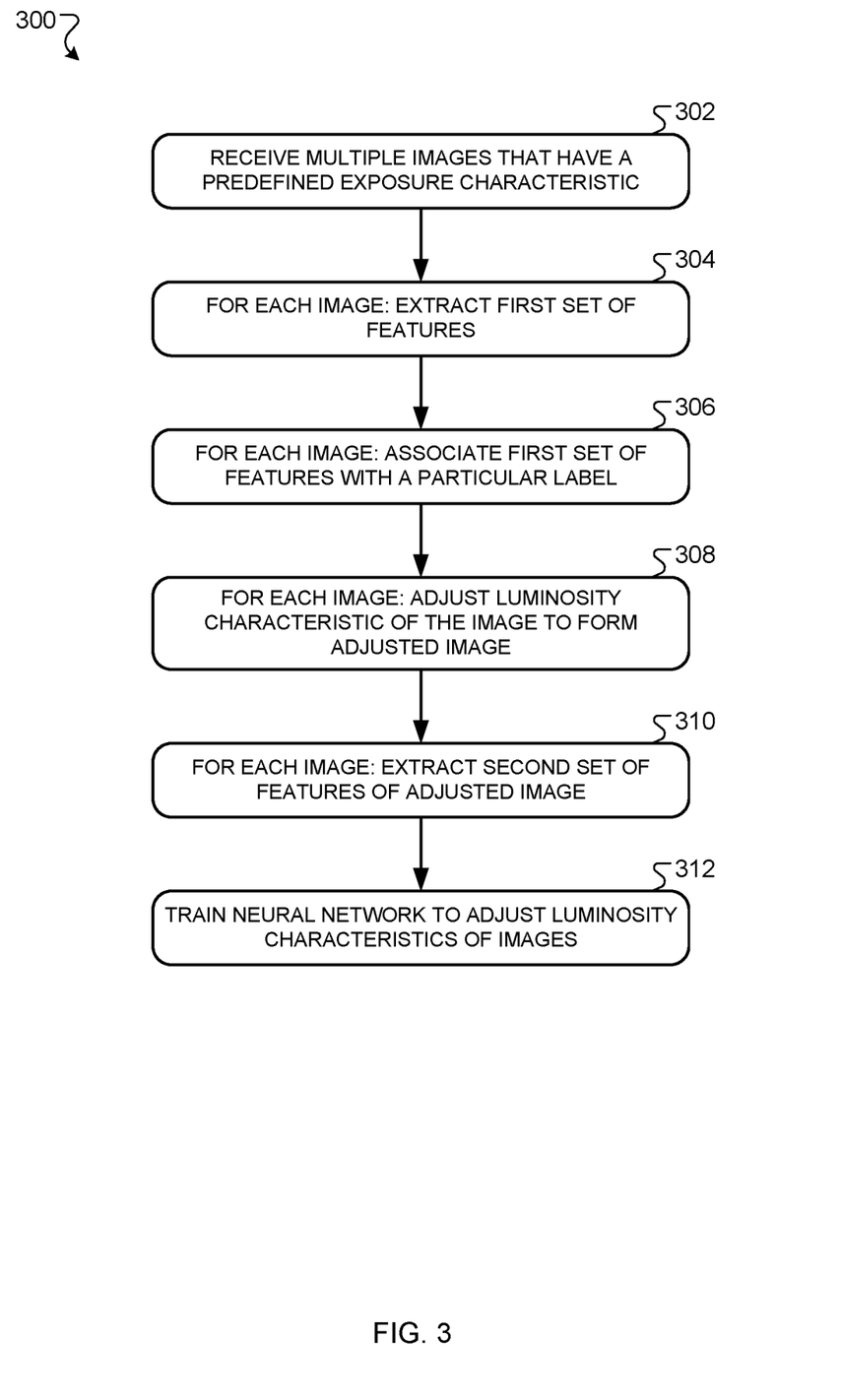
FIG. 3 is a flow diagram of an example process for adjusting an exposure attribute of a digital image.

FIG. 3 is a flow diagram of an example process 300 for adjusting an exposure attribute of a digital image. Process 300 can be implemented or executed using the systems described above. Thus, descriptions of process 300 may reference one or more of the above-mentioned computing resources of system 100, ML system 108, or other example server/cloud-based computing systems. In some implementations, the described actions of process 300 are enabled by computing logic or programmed instructions executable by one or more processing devices and memory of systems described in this document.

At block 302 of process 300, system 100 receives multiple images that each have a predefined exposure attribute. Each of the multiple images can be characterized as a well-exposed curated image based on the predefined exposure attribute of the image. At block 304 of process 300, a feature extractor of system 100 extracts features of the image to form a first set of extracted features. For example, feature extractor 120 can extract features from each image of the multiple well-exposed images that have the predefined exposure attribute. In some implementations, feature extractor 120 extracts one or more features that correspond to objects of an image, e.g., a human face or trees in a forest, identified by recognizer 118.

At block 306, image processor 116 associates the first set of features with a label indicating no modification of the image is required. In some implementations, associating the first set of extracted features with a label includes generating a zero correction value that indicates no modification or correction of an extracted image feature is required. At block 308 of process 300, image processor 116 uses image modifier 206 to adjust a luminosity characteristic of the image in accordance with a particular adjustment magnitude to form an adjusted image. In some implementations, adjusting the luminosity characteristic of the image includes generating an adjustment value that indicates the particular adjustment magnitude.

At block 310, feature extractor 208 extracts a second set of features of the adjusted image. In some implementations, extracting the second set of features of the adjusted image includes generating a corresponding correction value that indicates an amount of correction needed to reverse the adjustments to the luminosity characteristic. In some instances, the generated adjustment value indicating the adjustment magnitude can be an inverse of the correction value.

At block 312 of process 300, system 100 includes a training mode in which neural network 218 of ML system 108 is trained to automatically adjust luminosity characteristics of images. For example, neural network 218 is trained using the first set of extracted features of the well-exposed curated images and the second set of extracted features of the adjusted image. During a runtime mode of system 100, the system uses a trained neural network 218 of exposure adjustment model 220 to adjust luminosity characteristics of images based on correction values generated by the adjustment model 220. In runtime mode, model 220 receives extracted features from a current image and generates the correction value based on analysis of the features of the current image. In some implementations, adjusting luminosity characteristics of images includes generating a current image using image generator 114 and adjusting a luminosity characteristic of the current image based on correction values determined by model 220.

Figure 4:
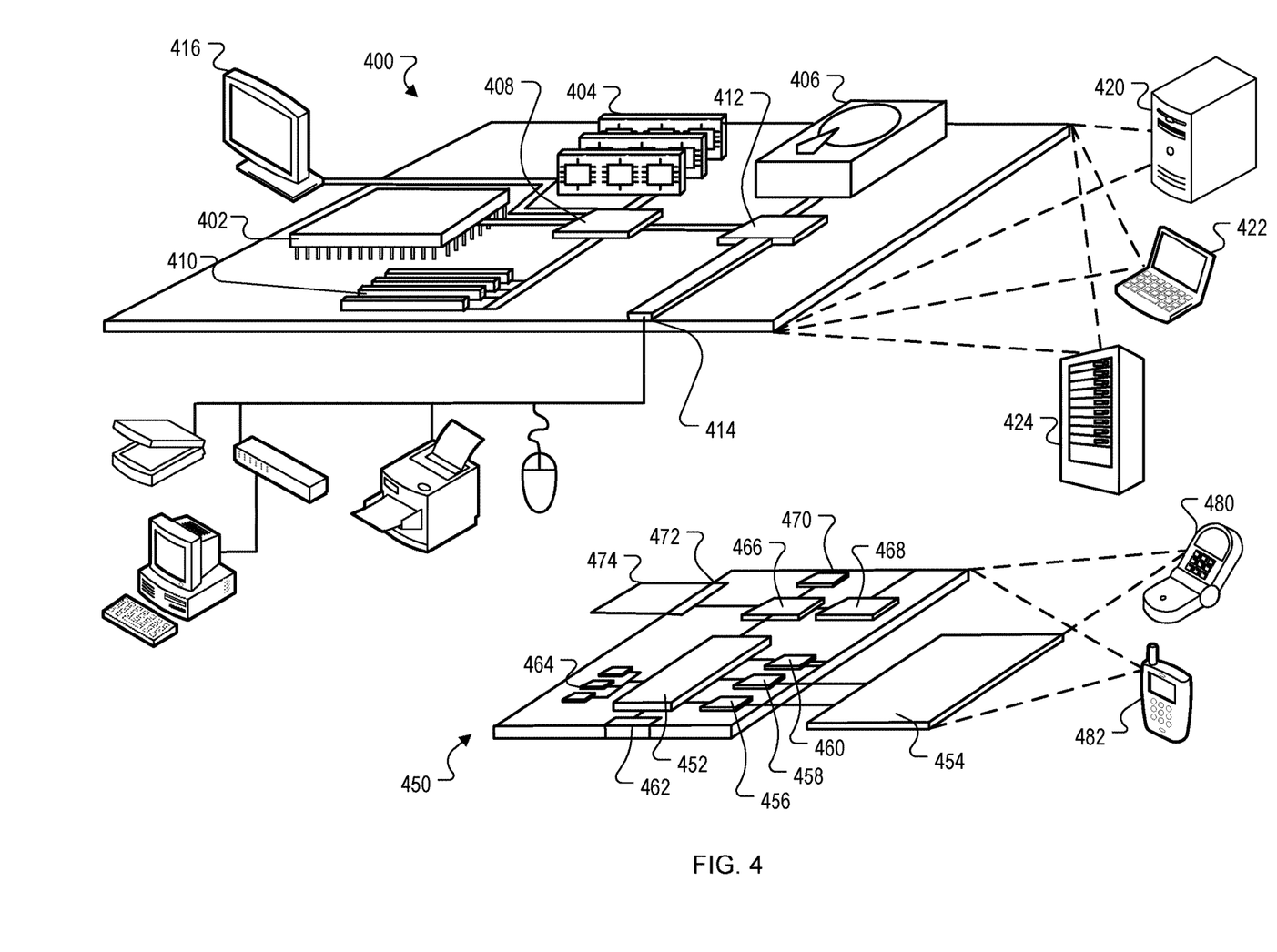
FIG. 4 is a block diagram of a computing system that can be used in connection with computer-implemented methods described in this specification.

FIG. 4 is a block diagram of computing devices 400, 450 that may be used to implement the systems and methods described in this document, either as a client or as a server or plurality of servers. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, smartwatches, head-worn devices, and other similar computing devices. The components shown here, their connections and relationships, and their functions, are meant to be exemplary only, and are not meant to limit implementations described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a computer-readable medium. In one implementation, the memory 404 is a volatile memory unit or units. In another implementation, the memory 404 is a non-volatile memory unit or units.

The storage device 406 is capable of providing mass storage for the computing device 400. In one implementation, the storage device 406 is a computer-readable medium. In various different implementations, the storage device 406 may be a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 404, the storage device 406, or memory on processor 402.

The high-speed controller 408 manages bandwidth-intensive operations for the computing device 400, while the low speed controller 412 manages lower bandwidth-intensive operations. Such allocation of duties is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can process instructions for execution within the computing device 450, including instructions stored in the memory 464. The processor may also include separate analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD display or an OLED display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provided in communication with processor 452, so as to enable near area communication of device 450 with other devices. External interface 462 may provide, for example, for wired communication (e.g., via a docking procedure) or for wireless communication (e.g., via Bluetooth or other such technologies).

The memory 464 stores information within the computing device 450. In one implementation, the memory 464 is a computer-readable medium. In one implementation, the memory 464 is a volatile memory unit or units. In another implementation, the memory 464 is a non-volatile memory unit or units. Expansion memory 474 may also be provided and connected to device 450 through expansion interface 472, which may include, for example, a SIMM card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provided as a security module for device 450, and may be programmed with instructions that permit secure use of device 450. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS receiver module 470 may provide additional wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here can be realized in digital electronic circuitry, integrated circuitry, specially designed ASICs, computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs, also known as programs, software, software applications or code, include machine instructions for a programmable processor, and can be implemented in a high-level procedural and/or object-oriented programming language, and/or in assembly/machine language. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

As used herein, the terms "machine-readable medium" "computer-readable medium" refers to any computer program product, apparatus and/or device, e.g., magnetic discs, optical disks, memory, Programmable Logic Devices (PLDs) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back-end component, e.g., as a data server, or that includes a middleware component such as an application server, or that includes a front-end component such as a client computer having a graphical user interface or a Web browser through which a user can interact with an implementation of the systems and techniques described here, or any combination of such back-end, middleware, or front-end components. The components of the system can be interconnected by any form or medium of digital data communication such as, a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Further to the descriptions above, a user may be provided with controls allowing the user to make an election as to both if and when systems, programs or features described herein may enable collection of user information (e.g., information about a user's social network, social actions or activities, profession, a user's preferences, or a user's current location), and if the user is sent content or communications from a server. In addition, certain data may be treated in one or more ways before it is stored or used, so that personally identifiable information is removed.

For example, in some embodiments, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

A number of embodiments have been described. Nevertheless, it will be understood that various modifications may be made without departing from the spirit and scope of the invention. For example, various forms of the flows shown above may be used, with steps re-ordered, added, or removed. Accordingly, other embodiments are within the scope of the following claims. Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:
obtaining, by a computing system, a first set of curated instances of image content that are characterized as well-exposed instances of image content;
forming, by the computing system, a second set of adjusted instances of image content by modifying luminosity of instances of image content that were characterized as well-exposed instances of image content before luminosity modification;
associating, by the computing system, each adjusted instance of image content in the second set of adjusted instances of image content with a respective correction value that indicates an amount that luminosity of the respective adjusted instance of image content was modified, forming a set of correction values associated with the second set of adjusted instances of image content;
training, by the computing system, a model to output, for a given instance of input content, a correction value for adjusting an exposure attribute of the given instance of input image content to generate a well-exposed instance of image content, the training performed using the following as training data:
(i) the first set of curated instances of image content that are characterized as well-exposed instances of image content,
(ii) the second set of adjusted instances of image content for which luminosity has been adjusted, and
(iii) the set of correction values associated with the second set of adjusted instances of image content;

after training the model, providing a particular instance of image content to the model;

receiving, from the model, a particular correction value for adjusting an exposure attribute of the particular instance of image content;

adjusting the particular instance of image content based on the particular correction value; and providing the adjusted, particular instance of image content for output.

2. The method of claim 1, wherein the model comprises a neural network that is trained using machine learning.

3. The method of claim 1, comprising associating each curated instance of image content in the first set of curated instances of image content with a correction value of zero, forming a set of correction values associated with the first set of curated instances of image content,
wherein the training the model uses, as training data, the set of correction values associated with the first set of curated instances of image content.

4. The method of claim 1, wherein adjusting the particular instance of image content based on the particular correction value comprises applying an inverse of the correction value to the particular instance of image content.

5. The method of claim 1, wherein the particular instance of image content is adjusted by a digital camera upon initially generating the particular instance of image content.

6. The method of claim 1, comprising:
performing, by the computing system, object recognition on a first image to identify a first object in the first image, the first set of curated instances of image content including the first object as a curated instance of image content;
performing, by the computing system, object recognition on a second image to identify a second object in the second image, the second set of adjusted instances of image content including the second object as an adjusted instance of image content; and
performing, by the computing system, object recognition on a particular image to identify a particular object in the particular image, the particular instance of image content being the particular object.

7. A system comprising:
one or more processing devices;
one or more non-transitory machine-readable storage devices for storing instructions that are executable by the one or more processing devices to cause performance of operations comprising:
obtaining, by a computing system, a first set of curated instances of image content that are characterized as well-exposed instances of image content;
forming, by the computing system, a second set of adjusted instances of image content by modifying luminosity of instances of image content that were characterized as well-exposed instances of image content before luminosity modification;
associating, by the computing system, each adjusted instance of image content in the second set of adjusted instances of image content with a respective correction value that indicates an amount that luminosity of the respective adjusted instance of image content was modified, forming a set of correction values associated with the second set of adjusted instances of image content;

training, by the computing system, a model to output, for a given instance of input content, a correction value for adjusting an exposure attribute of the given instance of input image content to generate a well-exposed instance of image content, the training performed using the following as training data:
(i) the first set of curated instances of image content that are characterized as well-exposed instances of image content,
(ii) the second set of adjusted instances of image content for which luminosity has been adjusted, and
(iii) the set of correction values associated with the second set of adjusted instances of image content;

after training the model, providing a particular instance of image content to the model;

receiving, from the model, a particular correction value for adjusting an exposure attribute of the particular instance of image content;

adjusting the particular instance of image content based on the particular correction value; and providing the adjusted, particular instance of image content for output.

8. The system of claim 7, wherein the model comprises a neural network that is trained using machine learning.

9. The system of claim 7, wherein the operations comprise associating each curated instance of image content in the first set of curated instances of image content with a correction value of zero, forming a set of correction values associated with the first set of curated instances of image content,
wherein the training the model uses, as training data, the set of correction values associated with the first set of curated instances of image content.

10. The system of claim 7, wherein adjusting the particular instance of image content based on the particular correction value comprises applying an inverse of the correction value to the particular instance of image content.

11. The system of claim 7, wherein the particular instance of image content is adjusted by a digital camera upon initially generating the particular instance of image content.

12. A computer-implemented method comprising:
providing, by a computing system, a particular instance of image content to a model, the model having been trained to output for a given instance of input content, a correction value for adjusting an exposure attribute of the given instance of input image content to generate a well-exposed instance of image content, the training having been performed using the following as training data:
(i) a first set of curated instances of image content that are characterized as well-exposed instances of image content,
(ii) a second set of adjusted instances of image content that were formed by modifying luminosity of instances of image content that were characterized as well-exposed instances of image content before luminosity modification, and
(iii) a set of correction values associated with the second set of adjusted instances of image content, each correction value in the set of correction values indicating an amount that luminosity of a respective adjusted instance of image content in the second set of adjusted instances of image content was modified;

receiving, by the computing system from the model, a particular correction value for adjusting an exposure attribute of the particular instance of image content;

adjusting, by the comping system, the particular instance of image content based on the particular correction value; and providing the adjusted, particular instance of image content for output.

13. The method of claim 12, wherein the model comprises a neural network that was trained using machine learning.

14. The system of claim 12, wherein:

each curated instance of image content in the first set of curated instances of image content is associated with a correction value of zero, forming a set of correction values associated with the first set of curated instances of image content; and the model was trained using, as training data, the set of correction values associated with the first set of curated instances of image content.

15. The method of claim 12, wherein adjusting the particular instance of image content based on the particular correction value comprises applying an inverse of the correction value to the particular instance of image content.

16. The method of claim 12, wherein the particular instance of image content is adjusted by a digital camera upon initially generating the particular instance of image content.

* * * * *